US008144155B2

United States Patent
Zhou et al.

(10) Patent No.: US 8,144,155 B2
(45) Date of Patent: Mar. 27, 2012

(54) EXAMPLE-BASED MOTION DETAIL ENRICHMENT IN REAL-TIME

(75) Inventors: Kun Zhou, Beijing (CN); Xiaohan Shi, Hangzhou (CN); Baining Guo, Redmond, WA (US)

(73) Assignee: Microsoft Corp., Redmond, WA (US)

( * ) Notice: Subject to any disclaimer, the term of this patent is extended or adjusted under 35 U.S.C. 154(b) by 861 days.

(21) Appl. No.: 12/189,212

(22) Filed: Aug. 11, 2008

(65) Prior Publication Data

US 2010/0033488 A1 Feb. 11, 2010

(51) Int. Cl.
*G06T 15/00* (2011.01)
(52) U.S. Cl. ............. 345/473; 345/474; 345/475; 703/6
(58) Field of Classification Search .............. 345/473, 345/474, 475; 703/6
See application file for complete search history.

(56) References Cited

U.S. PATENT DOCUMENTS

| | | | |
|---|---|---|---|
| 5,712,964 | A | 1/1998 | Kamada et al. |
| 6,317,130 | B1 | 11/2001 | Ishikawa et al. |
| 6,388,670 | B2 | 5/2002 | Naka et al. |
| 6,700,586 | B1 | 3/2004 | Demers |
| 7,242,405 | B2 | 7/2007 | Cohen et al. |
| 7,634,394 | B2 * | 12/2009 | Macura et al. .................. 703/6 |
| 7,859,538 | B2 * | 12/2010 | Isner et al. .................... 345/473 |
| 2003/0184544 | A1 | 10/2003 | Prudent |
| 2005/0264563 | A1 | 12/2005 | Macura et al. |
| 2007/0035541 | A1 | 2/2007 | Isner et al. |
| 2008/0024487 | A1 | 1/2008 | Isner et al. |
| 2008/0100622 | A1 | 5/2008 | Gordon |

OTHER PUBLICATIONS

Lewis, et al., "Pose Space Deformation: A Unified Approach to Shape Interpolation and Skeleton-Driven Deformation", retrieved at <<http://www.idiom.com/~zilla/Work/PSD/PSD.pdf>>, Proceedings of the 27th annual conference on Computer graphics and interactive techniques, Jul. 23-28, 2000, pp. 165-172.
Rhee, et al., "Real-Time Weighted Pose-Space Deformation on the GPU", retrieved at <<http://graphics.usc.edu/~trhee/papers/Rhee06_EG.pdf>>, Eurographics 2006, vol. 25 (2006), No. 3, Sep. 7, 2006, pp. 10.
Capell, et al., "Interactive Skeleton-Driven Dynamic Deformations", retrieved at <<http://grail.cs.washington.edu/pub/papers/capell-2002-ISD.pdf>>, From the proceedings of ACM SIGGRAPH 2002, vol. 21, Issue 3, Jul. 2002, pp. 8.
Kavan, et al., "Real Time Skin Deformation with Bones Blending", retrieved at <<http://147.228.63.9/wscg2003/Papers_2003/G61.pdf>>, Feb. 5, 2003, pp. 6.

(Continued)

*Primary Examiner* — Phu Nguyen
(74) *Attorney, Agent, or Firm* — Katrina A. Lyon; Lyon & Harr, LLP (57) ABSTRACT

An approach to enrich skeleton-driven animations with physically-based secondary deformation in real time is described. To achieve this goal, the technique described employs a surface-based deformable model that can interactively emulate the dynamics of both low- and high-frequency volumetric effects. Given a surface mesh and a few sample sequences of its physical behavior, a set of motion parameters of the material are learned during an off-line preprocessing step. The deformable model is then applicable to any given skeleton-driven animation of the surface mesh. Additionally, the described dynamic skinning technique can be entirely implemented on GPUs and executed with great efficiency. Thus, with minimal changes to the conventional graphics pipeline, the technique can drastically enhance the visual experience of skeleton-driven animations by adding secondary deformation in real time.

20 Claims, 4 Drawing Sheets

OTHER PUBLICATIONS

Alliez, et al., "Variational tetrahedral meshing", ACM Trans. Graph. vol. 24, Issue 3, Jul. 2005, pp. 617-625.
Bergou, et al., "Tracks: toward Directable Thin shells", ACM Trans. Graph, vol. 26, Issue 3, Jul. 2007, pp. 10.
Bhat, et al., "Estimating cloth simulation parameters from video", In Proceedings of SCA'03, Jul. 26-27, 2003, pp. 37-51.
Bianchi, et al., "Simultaneous topology and stiffness identification for mass-spring models based on FEM reference deformations", 7th International conference on MICCAI, Sep. 26-29, 2004, pp. 293-301.
Bourguignon, et al., "Controlling anisotropy in mass-spring systems", In Proceedings of Computer Animation and Simulation'00, Aug. 2000, pp. 113-123.
Capell, et al., "Interactive skeleton-driven dynamic deformations". ACM Trans. Graph. vol. 21, Issue 3, Jul. 2002, pp. 586-593.
Dempster, et al., "Maximum likelihood from incomplete data via the em algorithm", Journal of the Royal Statistical Society. Series B (Methodological) vol. 39, Issue 1, 1977, pp. 1-38.
Wilhelms, Jane. "Modeling animals with bones, muscles, and skin", Technical report. University of California at Santa Cruz., Jan. 24, 1994, pp. 20.
Haralick, et al., "Pose estimation from corresponding point data", IEEE Transactions on Systems, Man and Cybernetics, vol. 19, Issue 6, Nov. 1989, pp. 1426-1446.
Hauser, et al., "Interactive deformation using modal analysis with constraints", In Graphics Interface, Jun. 2003, pp. 247-256.
James, et al., "Artdefo: accurate real time deformable objects", In Proceedings of SIGGRAPH'99, Aug. 8-13, 1999, pp. 65-72.
James, et al., "Dyrt: dynamic response textures for real time deformation simulation with graphics hardware", ACM Trans. Graph. vol. 21, Issue 3, 2002, pp. 582-585.
James, et al., "Real time simulation of multizone elastokinematic Models", Proceedings of ICRA'02 1,2002., pp. 927-932.
Larboulette, et al., "Dynamic skinning: adding real-time dynamic effects to an existing character animation", In Proceedings of SCCG'05, 2005, pp. 87-93.
Lee, Matt, "Seven ways to skin a mesh: Character skinning revisited for modern GPUS" In Proceedings of GameFest, Microsoft Game Technology Conference, 2006, pp. 5.
Lewis, et al., "Pose space deformation: a unified approach to shape interpolation and skeleton-driven deformation", In Proceedings of SIGGRAPH'00, 2000, pp. 165-172.
Lindholm, et al., "A user programmable vertex engine", In Proceedings of SIGGRAPH'01, 2001, pp. 149-158.
Magnenat-Thalmann, et al., "Joint-dependent local deformations for hand animation and object grasping", In Proceedings of GI'88, 1988, pp. 26-33.
McNamara, et al., "Fluid control using the adjoint method", ACM Trans. Graph. 23, 3, 2004, pp. 449-456.
Mohr, et al., "Building efficient, accurate character skins from examples", ACM Trans. Graph. 22, 3, 2003, pp. 562-568.
Molino, et al., "A crystalline, red green strategy for meshing highly deformable objects with tetrahedra", In IMR, 2003, pp. 103-114.
Muller, et al., "Interactive virtual materials", In Proceedings of GI'04, 2004, pp. 239-246.
Muller, et al., "Meshless Deformations based on shape matching", ACM Trans. Graph. 24, 3, 2005, pp. 471-478.
O'Brien, et al., "Combining active and passive simulations for secondary motion", IEEE Comput. Graph. Appl. 20, 4, 2000, pp. 86-96.
Park, et al., "Capturing and animating skin deformation in human motion", ACM Trans. Graph. 25, 3, 2006, pp. 881-889.
Pentland, et al., "Good vibrations: model dynamics for graphics and animation", In Proceedings of SIGGRAPH'89, 1989, pp. 215-222.
Rivers, et al., "FastLSM: fast lattice shape matching for robust real-time deformation", ACM Trans. Graph. 26, 3, 82, 2007, pp. 2.
Sand, et al., "Continuous capture of skin deformation", ACM Trans. Graph. 22, 3, 2003, pp. 578-586.
Shi, et al., "Mesh puppetry: cascading optimization of mesh deformation with inverse kinematics", ACM Trans. Graph. 26, 3, 81, 2007, pp. 9.
Sumner, et al., "Mesh-based inverse kinematics", ACM Trans. Graph. 24, 3, 2005, pp. 488-495.
Teschner, et al., "A versatile and robust model for geometrically complex deformable solids", In Proceedings of CGI'04, 2004, pp. 312-319.
Von Funck, et al., "Elastic secondary deformations by vector field integration", In Proceedings of SGP'07, 2007, pp. 99-108.
Wang, et al., "Real-time enveloping with rotational regression", ACM Trans. Graph. 26, 3, 73, 2007, pp. 9.

* cited by examiner

EXAMPLE-BASED MOTION DETAIL ENRICHMENT IN REAL-TIME

BACKGROUND

Skeleton-driven animation is widely used in the computer graphics industry, especially for interactive applications such as video games. However, such animations are often devoid of intricate physical motion details (i.e., secondary deformation) due to the small number of degrees of freedom (DoFs) in typical animation skeletons and the time-consuming manual work required to add physically-realistic secondary motions. With physically-based simulators, fine physical details up to the spatial and temporal resolution can be simulated. Unfortunately, simulating high frequency motions on top of an arbitrary skeleton-driven animation is rarely achievable in real time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The example-based dynamic skinning technique described herein adds physically-realistic secondary deformations (e.g., surface motion details) to skeleton-driven animations at real-time rates. The technique employs a simplified deformable model which is surface-based, interactive, and capable of exhibiting both low- and high-frequency volumetric effects. In one embodiment of the example-based dynamic skinning technique, this interactive model contains only surface vertices—no interior vertices are necessary. The technique is capable of generating low-frequency phenomena such as muscle bulging, as well as high-frequency vibrations like the jiggling of fat tissues. While only surface vertices are used, the model mimics much of the behavior of a real volumetric material.

In one embodiment of the example-based dynamic skinning technique, given a surface mesh of an object to be animated and a few sample animation sequences of the physical behavior of the object being animated with and without surface motion details, a set of motion parameters of the material (e.g., material properties) are learned during an off-line pre-processing step. The deformable model is then applicable to any given skeleton-driven animation of the surface mesh for the animated object.

In one embodiment, the described example-based dynamic skinning technique is implemented on a Graphics Processing Unit (GPU) and executed with great efficiency.

In the following description of embodiments of the disclosure, reference is made to the accompanying drawings which form a part hereof, and in which are shown, by way of illustration, specific embodiments in which the technique may be practiced. It is understood that other embodiments may be utilized and structural changes may be made without departing from the scope of the disclosure.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the example-based dynamic skinning technique, reference is made to the accompanying drawings, which form a part thereof, and which is shown by way of illustration examples by which the example-based dynamic skinning technique may be practiced. It is to be understood that other embodiments may be utilized and structural changes may be made without departing from the scope of the claimed subject matter.

1.0 Example-Based Dynamic Skinning Technique.

The example-based dynamic skinning technique described herein can be viewed as a surface-based approximation to a linear elasticity simulation. A skeleton animation drives the motion of vertices of a surface mesh covering a skeleton of an object being simulated, while elastic forces from both the surface neighbors and the interior of the mesh, as well as damping are taken into account. Since there are no interior vertices, elastic forces from the interior of the mesh are approximated by adding length-maintaining spokes between the surface vertices and the corresponding bones. The material properties of the mesh are defined by a set of per-surface-vertex parameters representing the strength of the above forces (neighborhood stiffness, elastic forces from the interior of the mesh, damping, and a restoration force to each vertex towards its position in the primary motion). The technique further employs a fitting algorithm to automatically learn these material parameters from user-provided examples of skeleton-driven animations, as an alternative/supplement to tuning the parameters manually. The examples can be acquired by physically-based simulation or from live data.

After the fitting stage, the model is ready to be applied to any given skeleton-driven animation of the surface mesh of the object. More precisely, in one embodiment, the model takes a skeleton-driven animation as input and determines the motion of the mesh using a set of fitted parameters and local (1-ring) vertex coordinates information from consecutive frames. Since only local information is used at runtime, commodity graphics hardware can be used to exploit vertex-level parallelism. This produces real-time performance on moderately large meshes, which is crucial for interactive applications like video games. Implemented as an additional rendering stage, secondary deformations (e.g., surface motion details) can thus be added to skeleton-driven animations in real time, with minimal changes to the conventional graphics pipeline.

The following sections provide a description of the state of the background art, an exemplary architecture, and exemplary processes for employing the example-based dynamic skinning technique. Details of exemplary embodiments of the technique are then provided.

1.1 Animation Background

There are many types of techniques which are used in the creation of animations. These include skeleton-driven deformation techniques, elastic deformable models and parameter fitting algorithms. This section provides some insight into these areas in order to provide a basis for the explanation of the example-based dynamic skinning technique that follows.

Skeleton-driven deformation techniques are extensively used to drive realistic animated characters. The most pervasive technique among them is linear blend skinning, also known as skeleton subspace deformation (SSD), which was later implemented efficiently on modern graphics hardware in the form of matrix-palette skinning. Significant improvements were made to address well-known artifacts like collapsing joints. Recently, a rotational regression model was introduced to capture common skinning deformation such as muscle bulging, twisting, and challenging regions such as the shoulders. Some researchers optimized bone transformation and skin-weight with surface-detail-preserving inverse-kinematics constraints during deformation. All of these techniques focus on the primary deformation of the surface mesh, but do not address secondary deformation (i.e., small idiosyncrasies or detailed motions) despite its significant impact on realism.

Volumetric deformable models can be incorporated with skeleton-driven animations via first constructing (possibly coarse) volumetric elements inside/around the surface mesh (using volumetric meshing algorithms, such as the red-green strategies, variational tetrahedral meshing, and so on), then simulating continuum elasticity in the volume, and finally reconstructing the (finely detailed) surface mesh from the volume elements through interpolation. Methods in this category include (but are not limited to) physically-based approaches such as the well-known basic finite element method, modal analysis, mass-spring systems, and non-physical approaches such as Fast Lattice Shape Matching. Volumetric deformable models usually achieve high-quality simulation results, at the cost of having to simulate all volumetric nodes during online computation.

Surface-based deformable models drastically increase efficiency by reducing the DoFs to only surface nodes. (The deformable model employed in the example-based skinning technique described herein falls into this category.) One animation technique introduced a boundary element method for static linear elasticity into graphics, and achieved through quasi-static simulation one of the earliest interactive-rate elastic simulations. Precomputed multizone elastokinematic models were introduced to simulate multibody kinematic systems which include elastostatic deformation. To extend to real dynamical simulation, another technique, based on modal analysis, discards all interior nodes after the preprocessing stage and excites the low-frequency modes by rigid body motions. Since this algorithm was implemented on GPUs and the number of modes in use was limited by hardware, very few (e.g., five) low-frequency modes were simulated, and thus high frequency dynamics (e.g., the jiggling of fat tissues) was not captured. Some animators modeled and animated animals using simulated individual bones and muscles, soft tissues, and skin. Others added local dynamic effects to classical animations of characters by specifying flesh elements. The use of muscles, soft tissues and flesh elements makes it hard to fit the skinning framework. Still other animators added elastic secondary deformation to a given primary deformation by the simulation of a low number of user-placed mass-spring sets. To simulate high-frequency dynamics realistically, many mass-spring sets need to be placed and tuned, requiring extensive manual work. Another group of animators introduced an animation method that uses computational physics to generate fine motion details while constraining the general motion to still follow a coarse (user-defined or precomputed) simulation. Their shell model is high resolution and can produce excellent surface detail. Since full-blown physics equations are used to generate high-quality final results, it does not allow interactive rates.

Parameter fitting algorithms learn model parameters from user-provided examples. Mesh-based inverse kinematics can learn a space of natural deformations from example meshes. One set of animators proposed learning from examples the parameters of their rotational regression model. Others proposed simultaneous identification of the topology and stiffness of mass-spring models based on finite element method (FEM) reference deformations. Yet others estimated the parameters of a cloth simulation from a video sequence of a real fabric.

Background information on animation in general having been provided, the following sections will provide a description of the example-based dynamic skinning technique.

1.2 Exemplary Architecture

One exemplary architecture 100, shown in FIG. 1, in which the example-based dynamic skinning technique can be practiced employs an example-based dynamic skinning module 102 that resides on a computing device 400, which will be discussed in greater detail with respect to FIG. 4. There are several inputs into the example-based dynamic skinning module 102. These include a surface mesh of an object to be animated 104, two skeleton-driven animation sequences for the surface mesh—a skeleton-driven animation sequence with surface motion details for the surface mesh and a skeleton-driven animation sequence without surface motion details for the surface mesh. These inputs are input into an iterative training module 108 which trains a deformable model 110 to learn a set of material properties of the skeleton-driven animation sequence with surface motion details. The iterative training, in order to produce the deformable model 110, is typically conducted in an off-line mode. Once the deformable model 110 is trained, it is input into a runtime module for determining the surface motion details 114 along with a new skeleton-driven animation sequence without surface motion details 112. Here the trained deformable model with the learned a set of material properties for the surface mesh 110 is applied to the new skeleton-driven animation sequence 112 to output an improved version of the new skeleton-driven animation with surface motion details 116 (for example, by displaying it on a display 118). Details of this architecture will follow in later sections. In one embodiment of the example-based dynamic skinning technique, determining the surface motion details for a skeleton-driven animation are executed on a graphics processing unit. Additionally, applying the deformable model to the new skeleton driven animation sequence operates in real-time.

1.3 Exemplary Processes for Employing the Example-Based Dynamic Skinning Technique.

In this section some exemplary processes for employing the example-based dynamic skinning technique are described. Details regarding these processes follow in the next section.

Figure 2:
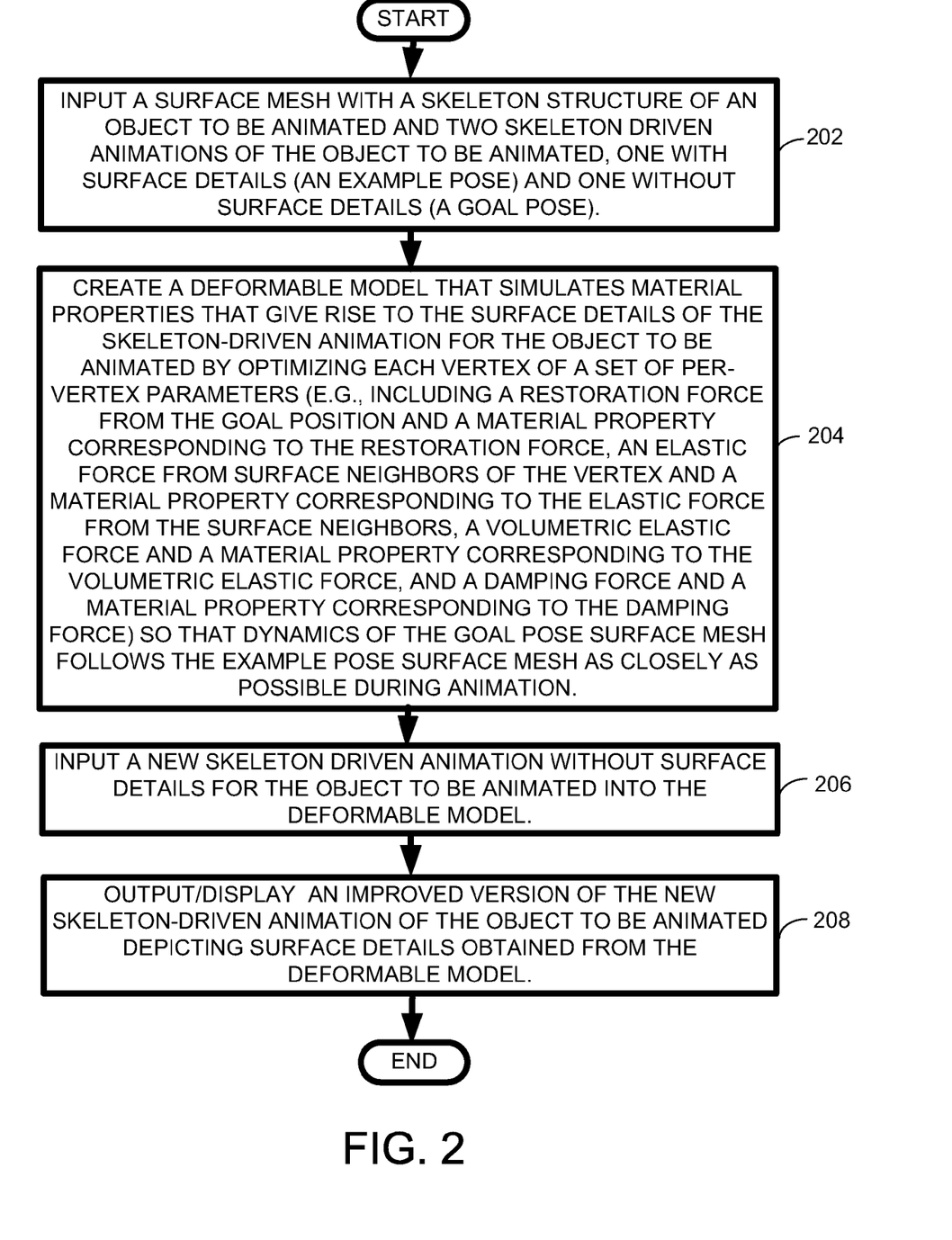
FIG. 2 is a flow diagram depicting an exemplary embodiment of a process employed in one embodiment of the example-based dynamic skinning technique.

An exemplary process for employing one embodiment of the example-based dynamic skinning technique is shown in FIG. 2. A surface mesh with a skeleton structure of an object and two skeleton driven animation sequences of the object to be animated, a first with an "example pose" with surface motion details, and a second with a "goal pose" without surface motion details are input (block 202). A deformable model is then created using an iterative training procedure (block 204). The dynamics of the model is guided by the skeleton and the goal pose. Each vertex experiences four forces besides any external force: a restoration force to goal position, an elastic force from surface neighbors, an volumetric elastic force from the skeleton structure/bone and a damping force. Details of the training process are provided below. The deformable model simulates material properties that give rise to the surface motion details of the skeleton-driven animation for the object to be animated by optimizing each vertex of a set of per-vertex parameters so that dynamics of the goal pose surface mesh follows the example pose surface mesh as closely as possible during animation (block 204). The per-vertex parameters, for each vertex, include the restoration force from the goal pose and a material property corresponding to the restoration force; the elastic force from surface neighboring vertices of the vertex and a material property corresponding to the elastic force from the surface neighboring vertices; the volumetric elastic force and a material property corresponding to the volumetric elastic force; and the damping force and a material property corresponding to the damping force. Once the deformable model is trained, a new skeleton-driven animation of the object to be animated into the deformable model (block 206). An improved new skeleton-driven animation depicting surface motion details of the object being animated is then obtained (block 208).

Figure 3:
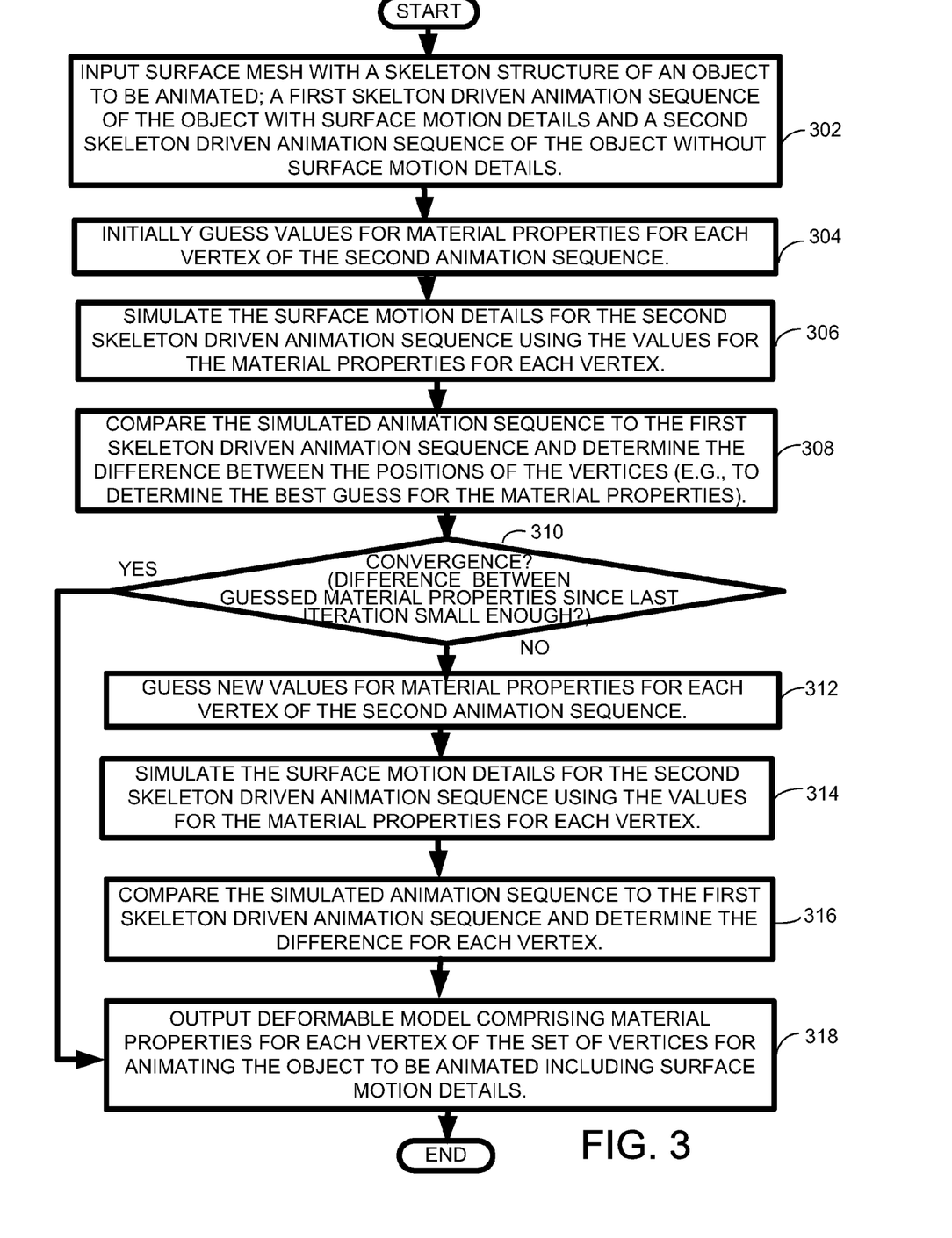
FIG. 3 is a flow diagram depicting an exemplary embodiment of a process employed in one embodiment of the example-based dynamic skinning technique for training a deformable model.

FIG. 3 depicts an exemplary process employed by one embodiment of the example-based dynamic skinning technique for training a deformable model used to produce the surface motion details for a skeleton-driven animation sequence of an object to be animated. Training the deformable model begins by inputting a surface mesh with a skeleton structure of an object to be animated and two skeleton driven animation sequences of the object to be animated, a first animation sequence with surface motion details, and a second animation sequence without surface motion details (block 302). Initial values for the material properties of each vertex of the second animation sequence for the skeleton driven animation without surface motion details are established (e.g., by guessing the values) (block 304). The surface motion details for the skeleton-driven animation sequence without surface motion details are then simulated by using the values for the established material properties for each vertex (block 306). The simulated animation sequence is then compared to the animation sequence with surface motion details and the difference between their corresponding vertices is determined (block 308). A check is made to see if there is convergence (e.g., the difference between the guessed material properties between iterations is small enough) (block 310). If not, new values for the material properties for each vertex are chosen and the process (blocks 310, 312, 314, 316, and 318) is repeated until the animation sequence with surface motion details and the simulated animation sequence converge (e.g., the difference between guessed material properties from one iteration to the next is as small as possible). More specifically, the differences between the vertices of the two animation sequences are compared, in order to find a better guess of the material properties. This iterative process goes until the convergence criterion is met, which is: the differences between guessed material properties between iterations is small enough. Once the animation sequence with surface motion details and the simulated animation sequence converge, the deformable model with the last set of material properties for each vertex of the set of vertices is output (block 318). It is then ready for use in applying surface motion details to other animation sequences.

It should be noted that many alternative embodiments to the discussed embodiments are possible, and that steps and elements discussed herein may be changed, added, or eliminated, depending on the particular embodiment. These alternative embodiments include alternative steps and alternative elements that may be used, and structural changes that may be made, without departing from the scope of the disclosure.

1.4 Exemplary Embodiments and Details.

Figure 1:
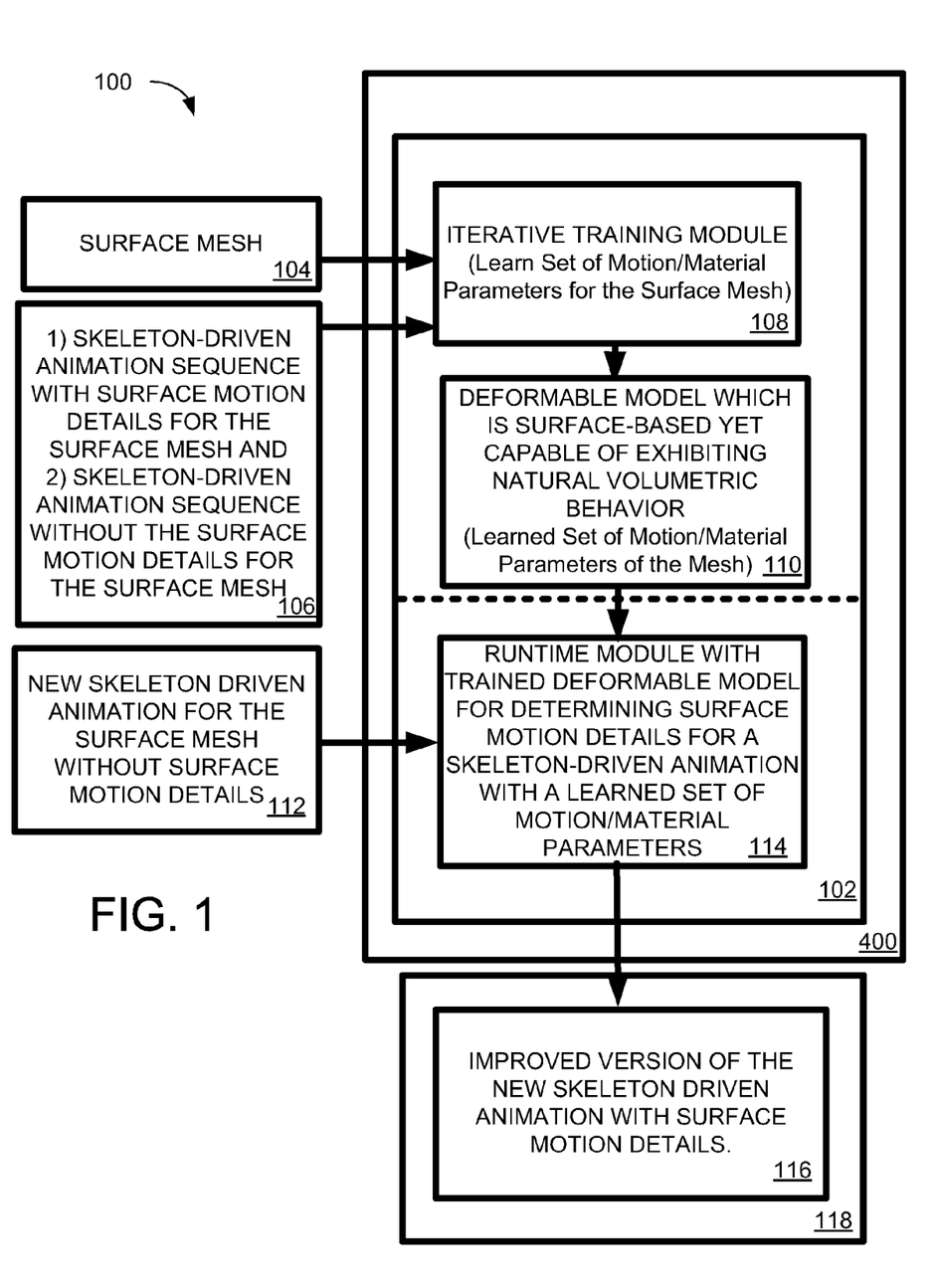
FIG. 1 is a diagram depicting one exemplary architecture in which one embodiment of the example-based dynamic skinning technique can be practiced.

The following paragraphs provide details and alternate embodiments of the exemplary architecture and processes presented above with respect to FIGS. 1, 2 and 3.

As discussed previously, the example-based dynamic skinning technique described herein enhances purely geometric, skeleton-driven mesh animations with physically-realistic secondary motions. As the coarse motion an animation starts from is generally not physical to begin with, the technique does not pursue physical accuracy. To improve efficiency for interactive applications like video games, the technique uses a surface-based deformable model trained by volumetric models (or example sequences) to further reduce computational complexity. Some contributions of the technique include:

1) An interactive deformable model which is surface-based, yet capable of exhibiting natural volumetric behavior.
2) An iterative fitting procedure that overcomes the high nonlinearity of learning the (locally optimal) motion parameters.
3) A fully GPU-based implementation of an on-the-fly dynamic skinning stage.

1.4.1 Deformable Model

This section presents details regarding the surface-based deformable model shown in FIG. 1, block 110, whose simulation is parallelizable and an iterative fitting procedure to automatically generate the parameters used in the deformable model.

To provide some background knowledge for the deformable model of the example-based dynamic skinning technique, a brief overview of FEM-style linear elasticity simulation is provided. All the degrees of freedom in a single time-varying vector x, seen as a point in a high-dimensional configuration space parameterized by a generalized coordinate system, are listed. The equations of motion (Newton's second law, or equivalently, the Euler-Lagrange equations) for x(t) are differential equations describing the dynamical behavior of the system:

$$M\ddot{x}+C\dot{x}+K(x-x_0)=f_{ext} \quad (1)$$

where M is the mass matrix, C is the damping coefficient matrix, K is the stiffness matrix, $x_0$ is the rest pose, and $f_{ext}$ is the generalized external force. Small displacements are usually assumed for linear models to work, while simple generalizations to large deformation through co-rotational frames exist.

In one embodiment of the technique, the real-time deformable model of the example-based dynamic skinning technique simulates a deformable object using an elastic thin shell supported by elastic spokes emanating from the bones in the skeleton. As the technique targets secondary motions caused by the primary motion, the technique adds, on top of the elastic forces, a restoration force to each vertex towards its position in the primary motion $\hat{x}$:

$$M\ddot{x}-F(x,x_0,\dot{x},\hat{x})=f_{ext} \quad (2)$$

where F is the total internal force. This is a governing equation the technique uses in the surface-based model. Note that the volumetric elastic force acting on surface nodes consists of two parts: those coming from surface neighbors, and those coming from interior neighbors. Since the model is surface-based, the degrees of freedom representing interior neighbors are not present. The details of how to approximate the elastic force from interior neighbors using spokes are detailed in the sections below.

In FEM, the state of the object is usually evolved in time using implicit integration when large time steps are used for improved stability. One embodiment of the example-based dynamic skinning technique chooses, instead, to use a simple, GPU-friendly explicit time integration since the technique seeks parallelism of the process instead of high accuracy. Forces are carefully implemented so that they do not overshoot when the integration scheme of the technique is applied.

As discussed previously, the original surface mesh is called the rest pose, and the skeleton-driven poses the goal poses (the technique employs skeleton subspace deformation to generate goal poses). For the i-th vertex the surface mesh, its position in the rest pose is denoted by $x_i^0$, its position in goal poses (i.e., the goal positions) by $\hat{x}_i(t)$, its dynamic position by $x_i(t)$ and its velocity by $v_i(t)$, where $t \in [0,T]$ is time and T is the duration of the animation. In the following sections, each of the simulation forces is first described, then the time integration is explained.

1.4.1.1 Per Vertex Forces

As discussed previously with respect to FIG. 2, particularly with respect to block 204 of FIG. 2, for each vertex of the mesh, four forces besides any external forces are evaluated and applied at each frame of the animation. They are: (1) a restoration force from goal position $G_i(t)$; (2) an elastic force from surface neighbors $L_i(t)$, (3) a volumetric elastic force $B_i(t)$, and (4) damping $D_i(t)$. When summed up to get the total force, each force is scaled by a factor denoting the strength of the force (e.g., neighborhood stiffness, strength of the spoke attaching that vertex to the bone, and so on) which best approximates the desired volumetric behavior. In other words, these factors are the material properties of the surface mesh. In one embodiment, the technique follows the common practice of mass lumping in elasticity simulation. Thus, without loss of generality, one can use the terms force and acceleration interchangeably, assuming the mass associated to the node is taken into account.

$$F_i(\Pi_i, t) = \alpha_i G_i(t) + \beta_i L_i(t) + \gamma_i B_i(t) + \lambda_i D_i(t) + F_{ext}(t). \quad (3)$$

These per-vertex parameters $\Pi = \{\alpha_i, \beta_i, \gamma_i, \lambda_i\}_{i \in vertices}$ allow the model to achieve different dynamical behaviors. The user may tune the parameters via a painting or curve-based editing interface, or use the fitting procedure described later to learn parameters from example animations. A description of these forces follows.

A. Restoration Force from Goal Position

Each vertex is pushed towards its goal position so that the simulated mesh can achieve equilibrium near the goal pose and converge if the goal pose stops moving.

$$G_i(t) = \frac{\hat{x}_i(t) - x_i(t)}{h^2}. \quad (4)$$

This term is the largest possible acceleration that does not produce overshoot over one time step h. The next two terms are also treated in the same fashion.

B. Elastic Force from Surface Neighbors

In FEM, adjacent nodes exert elastic forces on each other when the element between them changes shape, inducing a locally non-zero strain tensor. The example-based dynamic skinning technique mimics this effect by maintaining the surface motion details: the position which best preserves the Laplacian coordinates is calculated, and the vertex is moved towards this position.

More precisely, let one consider a single vertex i and its local neighborhood nbr(i). First, the optimal rotation R from the rest pose (of the neighborhood) to the current pose is calculated via a polar decomposition of $$A = \sum_{j \in nbr(i)} (x_j(t) - x_i(t))(x_j^0 - x_i^0)^T. \quad (5)$$

In terms of the singular value decomposition of A, A=UDV, one has R=UV. Then, the position which best preserves the Laplacian coordinates is calculated as $$c_i(t) = \frac{1}{|nbr(i)|} \sum_{j \in nbr(i)} (R(x_i^0 - x_j^0) + x_j(t)). \quad (6)$$

Thus the surface detail preserving force is $$L_i(t) = \frac{c_i(t) - x_i(t)}{h^2}. \quad (7)$$

Here the example-based dynamic skinning technique chooses the graph Laplacian over other forms of Laplacian operators (e.g., cotangent form) mainly due to its simple uniform weights, which means no extra texture storage or tex-read operations are needed for GPU implementation. The same reasoning also leads one to use the graph Laplacian in the damping term discussed below.

C. Volumetric Elastic Force

In FEM, surface vertices experience elastic forces not only from surface neighbors, but also from the inside of the material. Since the example-based dynamic skinning technique reduces the model to be purely boundary-based for efficiency, the positions and momenta usually stored at interior vertices are unavailable. It is not possible in theory to use only a thin shell model to simulate volumetric elasticity with full accuracy. However, for models with a skeleton, one observes that visually one of the most important volumetric behaviors not already captured by the restoration force to goal positions is the tendency to restore the distance between the boundary vertex and the bone supporting it. Modeling this behavior alone obviously omits the subtle interaction between boundary vertices and interior vertices, and the interaction between nonadjacent boundary vertices through internal elements. However, these detailed effects are not compatible with interactive-rate requirements. Nevertheless, in one embodiment of the technique, the technique's basic model is extended to include a proper treatment of the low-frequency modes if the application requires so.

For the sake of performance, one embodiment of the example-based dynamic skinning technique takes a simplistic model where the surface vertices are linked directly to the bones by pseudo-springs that can slide along the bones. (Adding a stick of specific mass and moment of inertia would be more desirable, but the technique uses this simple model since the restoration force to goal position has partially taken the other volumetric effects into account, and in practice it serves its purpose well.) During the simulation, a force along the spoke tries to maintain the length of the spring through the following term:

$$B_i(t) = \frac{(|x_{ib}^0|/|x_{ib}(t)| - 1)x_{ib}(t)}{h^2}, \quad (8)$$

where $x_{ib}$ is the difference between a vertex and its projection on the bone. For joint regions, a surface vertex is linked to several bones. In this case, the forces from each bone are averaged using the usual skin weights. With this term, the model is capable of reproducing the visually important part of the volumetric behavior, i.e., it can mimic the resistance to local volume change.

D. Damping

With commonly used Rayleigh damping, a vertex of a mesh experiences resistance when its velocity differs from its neighbors. To approximate the effect of such damping forces, the velocity of a vertex is smoothed based on its 1-ring neighbors, again using the graph Laplacian:

$$D_i(t) = \frac{1}{h|nbr(i)|} \sum_{j \in nbr(i)} v_j(t) - v_i(t). \quad (9)$$

1.5.1.2 Ranges of the Parameters

To simulate different material properties, in one embodiment of the example-based dynamic skinning technique, the terms above are scaled by corresponding parameters before being employed in the dynamics described in the next section. Since the largest possible forces are normalized without causing instability to be 1 (the parameters actually correspond to F/m instead of F), the natural limits to these parameters are [0,1], with the exception of λ which should be within [0,0.5] to ensure the stability of the system.

1.5.2 Dynamical Simulation The dynamical simulation of the model is straightforward. In one embodiment of the technique, a symplectic Euler integration scheme is used for its simplicity and efficiency. More specifically, at each time step, the velocity of the vertices are first updated explicitly based on the above terms, then the positions are updated explicitly using the latest velocity:

$$v_i(t+h) = v_i(t) + hF_i(\Pi, t), \quad (10)$$

$$x_i(t+h) = x_i(t) + hv_i(t+h). \quad (11)$$

1.4.3 Iterative Fitting

The iterative fitting procedure described in this section amplifies the procedure shown in FIG. 3 previously discussed. The deformable model described above contains four parameters for each vertex. Although manual tuning via painting or a spline-based editing interface can be applied, the user may have already obtained satisfactory examples for the behavior of the given mesh. Thus, one embodiment of the example-based dynamic skinning technique employs an iterative fitting procedure to learn the material properties directly from example animations.

More specifically, in one embodiment of the technique, shown in FIG. 3 block 302, the input of the fitting procedure includes a surface mesh with a skeleton structure, and two skeleton-driven animations—one with physical details (the example pose) and one without (the goal pose). The fitting process optimizes the set of per-vertex parameters Π so that when driven by the goal pose, the surface mesh follows the example pose as closely as possible:

$$\Pi = \underset{\Pi}{\operatorname{argmin}} E(\Pi). \quad (12)$$

As shown in block 308, of FIG. 3, the similarity of the two animations is measured by the difference between the positions of vertices computed as:

$$E(\Pi) = \sum_t \sum_i \|x_i(t) - p_i(t)\|^2, \quad (13)$$

where $p_i(t)$ is the position of the i-th vertex in the example animation (assuming regular time steps). The above measure can also be weighted to adapt to irregularly sampled meshes, or to stress certain segments containing particularly desirable behaviors in the sequences.

Given such a non-linear optimization problem, gradient descent or Newton's method could be applied. However, such algorithms require the gradient (and possibly the Hessian) of the function to be evaluated at each iteration, which is both costly and difficult to compute even with the adjoint method (as the adjoint matrices involve taking derivatives of the forces based on positions of the neighbors and the polar decomposition).

The technique instead employs a customized iterative optimization procedure. Suppose one has an initialization of the parameters $\Pi^0$. Let one assume one is now in the k-th iteration ($k \geq 0$) and one already has the parameters $\Pi^k$. The simulated sequence can be constructed according to $\Pi^k$ and the dynamics. Denote its position and velocity by $x_i^k(t)$ and $v_i^k(t)$ respectively. One obtains the parameters of the next iteration $\Pi^{k+1}$ via:

$$\Pi^{k+1} = \underset{\Pi}{\operatorname{argmin}} E^k(\Pi) \quad (14)$$

$$\text{s.t. } \alpha, \beta, \gamma \in [0, 1] \text{ and } \lambda \in [0, 0.5],$$

where the evaluation of $E^k(\Pi)$ will be explained below. After $\Pi^{k+1}$ is solved, the algorithm advances to the (k+1)-th iteration, and the dynamics is simulated again using $\Pi^{k+1}$ to obtain the sequence $x_i^{k+1}(t)$ and $v_i^{k+1}(t)$. The above iterative procedure loops until convergence, as shown in blocks 310, 312, 314, 316 and 318 of FIG. 3.

The technique evaluates $E^k(\Pi)$ in Eq. (14) by expanding Eq. (13) using Eq. (10) and (11):

$$E^k(\Pi) = \sum_t \sum_i \|x_i(t+h) - p_i(t+h)\|^2 \quad (15)$$

$$= \sum_t \sum_i \|x_i^k(t) + hv_i^k(t) + h^2 F_i^k(\Pi_i, t) - p_i(t+h)\|^2,$$

where $F_i^k(\Pi_i,t)$ is the force term generated using $x_i^k(t)$, $v_i^k(t)$ and Π. Inspired by the expectation-maximization (EM) algorithm, all positions and velocities constant in the above equation are considered (basically treating each step of the motion as a separate short sequence). Consequently $E^k$ depends only on F, thus $E^k$ can be regarded as a function of variable $\Pi$ only.

Further, notice that the terms involving the parameters of any individual vertex use only its neighbors' positions and velocities (which are considered constant). The energy minimization problem, Eq. (14), can thus be split into a per-vertex quadratic programming (QP) problem, which can be solved efficiently:

$$\Pi_i^{k+1} = \underset{\Pi_i}{\operatorname{argmin}} \sum_t \|x_i^k(t) + hv_i^k(t) + h^2 F_i^k(\Pi_i, t) - p_i(t+h)\|^2 \quad (16)$$

s.t. $\alpha_i, \beta_i, \gamma_i \in [0, 1]$ and $\lambda_i \in [0, 0.5]$.

It is noted that even if the physical material is uniform, the surface-based parameters learned from volumetric material can still be non-uniform. An important issue is that the parameter values of consecutive iterations (say, $\Pi^k$ and $\Pi^{k+1}$) might differ greatly. Direct update of the value of $\Pi$ from $\Pi^k$ to $\Pi^{k+1}$ may cause the optimization process to diverge. In order to make the process more stable, a step-ratio coefficient μ can be defined so that whenever the value of a new iteration is calculated, the actual solution is moved only partially towards the new value. Table 1 provides pseudo code for a fitting procedure employed in one embodiment of the technique.

TABLE 1

Pseudocode of Fitting Procedure.

k = 0
repeat
    //SIMULATE THE SEQUENCE
    Simulate the dynamics using $\Pi^k$ to get $x_i^k(t)$ and $v_i^k(t)$
    //PERFORM ONE STEP OF THE OPTIMIZATION
    FOR i = 1 to N do
    //For each vertex
    Solve Eq. (16) via QP, and obtain $\Pi_i^{k+1}$
    //ADVANCE TO THE NEXT ITERATION
    $\Pi^{k+1} = (1 - \mu)\Pi^k + \mu\Pi^{k+1}$
    k = k + 1
until $|E^k - E^{k-1}|/E^0 < \epsilon$ 1.4.3.1 Implementation Details and Discussion From numerical tests, a step-ratio μ within the range of [1/T,0.1] is usually sufficient for stability, where T>10 is the duration of the given sequences. Having no prior knowledge of the optimal solution, the technique uses α=1, β=γ=λ=0 as an educated guess for the initial values of all vertices. The initial sequence thus follows the goal poses, which is reasonable because the goal poses match the example poses up to secondary deformations.

In the definition of the distance between two sequences, it is plausible to include the difference between the velocities of the two animations. This corresponds to a Sobolev norm, with the two sequences regarded as two functions in time. In one tested embodiment of the technique, this norm only provided negligible improvement.

From Eq. (10) and (11), one can see that $x_i(t+h)$ depends recursively on $x_i(t)$, and each recursion involves increasing the orders of the terms containing Π by one (actually, nonlinear dependence on Π is also involved). Thus, $x_i(t+h)$ is more complicated than a high degree polynomial of Π. This is why, in one embodiment, the technique resorts to sequential quadratic programming, so that each step can be dealt with as a linear problem. Another benefit is that it is easy to implement, since the calculation of the gradient is avoided.

1.4.4 Dynamic Skinning on GPUs

After the per-vertex parameters are obtained, one embodiment of the example-based dynamic skinning technique is ready to simulate the additional physically-based secondary motion on any given skeleton-driven animation of an object. In one embodiment of the technique, this process is implemented as an additional pass in the graphics pipeline before rendering (before the rendering pass in a commodity GPU). Indexed matrix palette skinning is implemented in this pass. Instead of rendering the vertices, the technique uses them as the goal pose. After the calculation, a typical rendering pass is invoked to render the mesh onto the screen.

One exemplary working implementation of the technique can simulate dynamics with great efficiency. In one test, a mesh with 25001 vertices was simulated at the speed of 610 frames-per-second. This means that the technique can add secondary deformation to animations and interactive applications with negligible additional time.

2.0 The Computing Environment

The example-based dynamic skinning technique is designed to operate in a computing environment. The following description is intended to provide a brief, general description of a suitable computing environment in which the example-based dynamic skinning technique can be implemented. The technique is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular mobile devices, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 4:
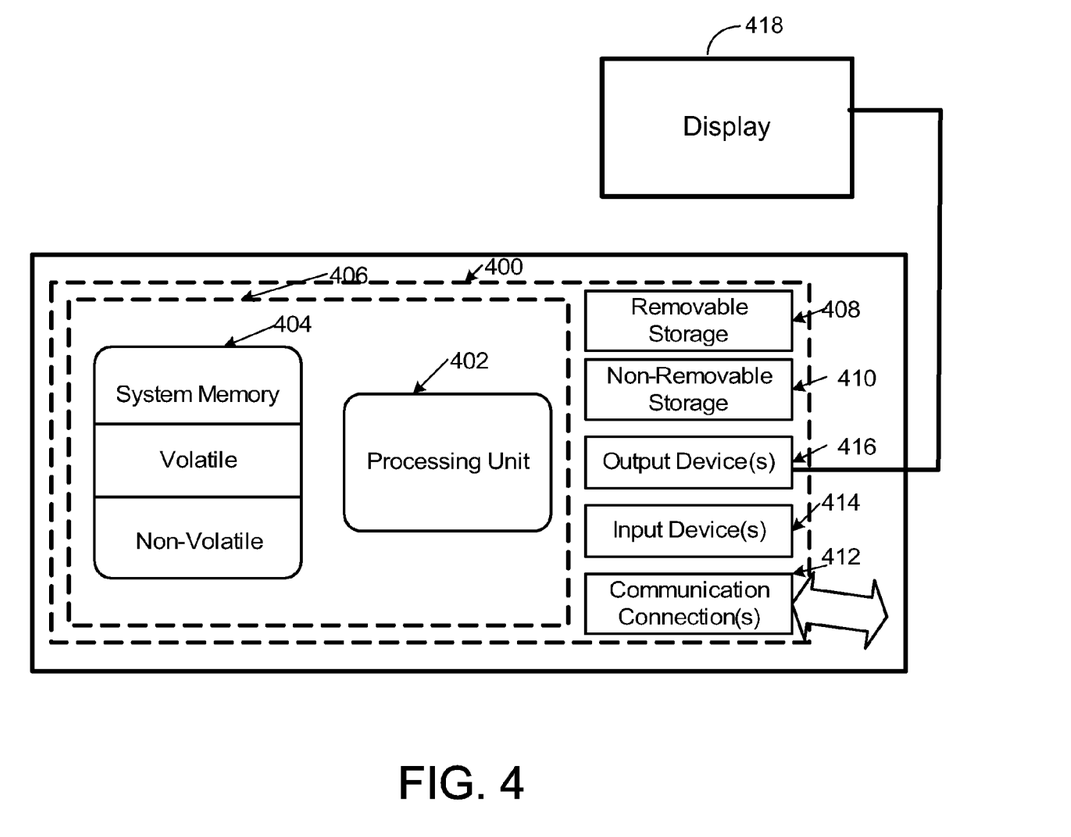
FIG. 4 is a schematic of an exemplary computing device in which the example-based dynamic skinning technique can be practiced.

FIG. 4 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 4, an exemplary system for implementing the example-based dynamic skinning technique includes a computing device, such as computing device 400. In its most basic configuration, computing device 400 typically includes at least one processing unit 402 and memory 404. Depending on the exact configuration and type of computing device, memory 404 may be volatile (such as RAM), non-volatile (such as ROM, flash memory, and so on) or some combination of the two. This most basic configuration is illustrated in FIG. 4 by dashed line 406. Additionally, device 400 may also have additional features/functionality. For example, device 400 may also include additional storage (removable and/or non-removable) including, but not limited to, magnetic or optical disks or tape. Such additional storage is illustrated in FIG. 4 by removable storage 408 and non-removable storage 410. Computer storage media includes volatile and nonvolatile, removable and non-removable media implemented in any method or technology for storage of information such as computer readable instructions, data structures, program modules or other data. Memory 404, removable storage 408 and non-removable storage 410 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 400. Any such computer storage media may be part of device 400.

Device 400 has a display 418, and may also contain communications connection(s) 412 that allow the device to communicate with other devices. Communications connection(s) 412 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 400 may have various input device(s) 414 such as a keyboard, mouse, pen, camera, touch input device, and so on. Output device(s) 416 such as speakers, a printer, and so on may also be included. All of these devices are well known in the art and need not be discussed at length here.

The example-based dynamic skinning technique may be described in the general context of computer-executable instructions, such as program modules, being executed by a computing device. Generally, program modules include routines, programs, objects, components, data structures, and so on, that perform particular tasks or implement particular abstract data types. The example-based dynamic skinning technique may be practiced in distributed computing environments where tasks are performed by remote processing devices that are linked through a communications network. In a distributed computing environment, program modules may be located in both local and remote computer storage media including memory storage devices.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

Wherefore, what is claimed is:

1. A computer-implemented process for animating surface motion details on a skeleton-driven animation, comprising:
    inputting a surface mesh with a skeleton structure of an object to be animated and two skeleton driven animation sequences of the object to be animated, a first with an example pose with surface motion details, and a second with a goal pose without surface motion details;
    creating a deformable model that simulates material properties that give rise to the surface motion details of the skeleton-driven animation for the object to be animated by optimizing each vertex of a set of per-vertex parameters so that dynamics of the goal pose surface mesh follows the example pose surface mesh closely during animation;
    inputting a new skeleton-driven animation of the object to be animated into the deformable model; and
    outputting an improved new skeleton-driven animation that depicts surface motion details obtained from the deformable model.

2. The computer-implemented process of claim 1 wherein the per-vertex parameters, for each vertex, further comprise:
    a restoration force from the goal pose and a material property corresponding to the restoration force;
    an elastic force from surface neighboring vertices of the vertex and a material property corresponding to the elastic force from the surface neighboring vertices;
    a volumetric elastic force and a material property corresponding to the volumetric elastic force; and
    a damping force and a material property corresponding to the damping force.

3. The computer-implemented process of claim 1 further comprising using the per-vertex parameters to determine the velocity and displacement of each vertex for each frame of the new animation.

4. The computer-implemented process of claim 1 wherein each volumetric elastic force is determined by employing a model that comprises a simulated elastic thin shell supported by elastic spokes emanating from bones of the skeleton structure of the skeleton driven animation.

5. The computer-implemented process of claim 1 further comprising creating the deformable model by:
    (a) initially guessing the material properties of each vertex;
    (b) simulating the surface motion details for the skeleton-driven animation sequence without details using the material properties;
    (c) comparing the simulated animation sequence to the animation sequence with surface motion details and determining a difference;
    (d) choosing new material properties for each vertex;
    (e) repeating (b), (c) and (d) until the animation sequence with surface motion details and the simulated animation sequence converge;
    (f) outputting the deformable model comprising the material properties for each vertex of the set of vertices.

6. The computer-implemented process of claim 5 wherein comparing the simulated animation sequence to the animation sequence with surface motion details and determining a difference for each vertex employs an energy minimization function.

7. The computer-implemented process of claim 1 further comprising using a graphics processing unit to obtain the improved skeleton-driven animation depicting surface motion details obtained from the deformable model.

8. The computer-implemented process of claim 1 further comprising displaying the improved skeleton-driven animation depicting surface motion details obtained from the deformable model in real-time.

9. A computer-implemented process for creating a deformable model for determining surface motion details on a skeleton-driven animation sequence, comprising:
    (a) inputting a surface mesh with a skeleton structure and two skeleton driven animation sequences, a first animation sequence with surface motion details, and a second animation sequence without surface motion details;
    (b) initially guessing values for the material properties of each vertex of the second animation sequence for the skeleton driven animation without surface motion details;

(c) simulating the surface motion details for the skeleton-driven animation sequence without surface motion details by using the values for the material properties for each vertex during the skeleton-driven animation sequence without details;

(d) comparing the simulated animation sequence to the animation sequence with surface motion details and determining a difference between the positions of corresponding vertices;

(e) choosing new values for the material properties for each vertex;

(f) repeating (c), (d) and (e) until the animation sequence with surface motion details and the simulated animation sequence converge, wherein convergence is based upon the difference between the new values for the material properties and the guessed material properties being small enough;

(g) outputting the deformable model comprising the material properties for each vertex of the set of vertices.

10. The computer-implemented process of claim 9 further comprising comparing the simulated animation sequence to the animation sequence with surface motion details and determining a difference for each vertex on a frame-by-frame basis.

11. The computer-implemented process of claim 9 wherein comparing the simulated animation sequence to the animation sequence with surface motion details and determining a difference for each vertex comprises employing an energy minimization function to determine convergence based on the chosen values for the material properties.

12. The computer-implemented process of claim 9 wherein the values for the material properties vary from vertex to vertex.

13. The computer-implemented process of claim 9 further comprising:
inputting a new skeleton-driven animation into the deformable model; and
displaying an improved version of the new skeleton-driven animation with surface motion details.

14. The computer-implemented process of claim 13, wherein displaying an improved version of the new skeleton-driven animation depicting surface motion details, further comprises computing the total force on each vertex wherein the total force for a given vertex comprises:
a restoration force from the position of the vertex without surface motion details and a material property corresponding to the restoration force which is obtained from the deformable model;
an elastic force from neighboring surface vertices of the vertex and a material property corresponding to the elastic force which is obtained from the deformable model;
a volumetric elastic force and a material property corresponding to the volumetric elastic force which is obtained from the deformable model; and
a damping force and a material property corresponding to the volumetric elastic force which is obtained from the deformable model.

15. The computer-implemented process of claim 14 further comprising using the total force to obtain the velocity and position of each vertex with surface motion details.

16. A system for determining surface motion details for a skeleton-driven animation, comprising:
a general purpose computing device;
a computer program comprising program modules executable by the general purpose computing device, wherein the computing device is directed by the program modules of the computer program to,
input a surface mesh, a skeleton-driven animation sequence with surface motion details for the surface mesh, and a skeleton-driven animation sequence without surface motion details for the surface mesh;
train a deformable model to learn a set of material properties of the skeleton-driven animation sequence with surface motion details for the surface mesh;
input a new skeleton-driven animation sequence without surface motion details into the trained deformable model;
apply the trained deformable model to the new skeleton-driven animation sequence to output an improved version of the new skeleton-driven animation, wherein the improved version of the new skeleton-driven animation displays surface motion details.

17. The system of claim 16 wherein determining surface motion details for a skeleton-driven animation are executed on a graphics processing unit.

18. The system of claim 17 wherein the deformable model contains only surface vertices and no interior vertices.

19. The system of claim 16 wherein the module to train the deformable model trains the deformable model off-line and wherein the trained deformable model operates in real-time.

20. The system of claim 16 wherein the skeleton-driven animation sequence with surface motion details for the surface mesh is based on actual data collected for an object to be animated.

* * * * *